United States Patent
Shalyt et al.

[15] 3,671,856
[45] June 20, 1972

[54] PULSE REFLECTION TYPE FAULT LOCATION DEVICE UTILIZING A DARK-TRACE TUBE DISPLAY

[72] Inventors: German Mikhailovich Shalyt, prospekt Vernadskogo, 83, kv. 45; Svetlana Efimovna Sidorchuk, ulitsa Festivalnaya, 22, korpus 3, kv. 287; Gely Georgievich Pavlov, Moskvorechie, 84, kv. 30, all of Moscow, U.S.S.R.

[22] Filed: Sept. 16, 1969

[21] Appl. No.: 858,430

[52] U.S. Cl. ...........................................324/52
[51] Int. Cl. .....................................G01r 31/11
[58] Field of Search......................................324/52

[56] References Cited

UNITED STATES PATENTS

| | | | |
|---|---|---|---|
| 2,345,932 | 4/1944 | Gould | 324/52 |
| 2,602,834 | 7/1952 | Leslie et al. | 324/52 |
| 2,651,752 | 9/1953 | Devot | 324/52 |
| 3,234,340 | 2/1966 | Youdan | 324/52 X |
| 2,709,784 | 5/1955 | Spaulding | 324/52 |
| 3,211,997 | 10/1965 | Hara | 324/52 |

Primary Examiner—Gerard R. Strecker
Attorney—Waters, Roditi, Schwartz & Nissen

[57] ABSTRACT

A device for the location of faults on power-transmission lines at the instant of a fault, in which transmitted and reflected pulses are registered in synchronism with calibration markers by a dark-trace tube, which fact considerably increases the speed of response of the recorder.

1 Claim, 5 Drawing Figures

PULSE REFLECTION TYPE FAULT LOCATION DEVICE UTILIZING A DARK-TRACE TUBE DISPLAY

The present invention relates to pulse-type instruments employed in power generation and distribution, and more specifically to devices for overhead line fault location at the instant of a fault, said device being used to detect and locate both sustained and transient faults (including those that may have occurred, for example, prior to a successful reclosure of an automatic circuit breaker in the associated line).

There exist fault locators for power transmission lines, in which transmitted and reflected pulses, controlled by a sync-pulse unit, are registered at the instant of a fault in synchronism with calibration markers by a recorder actuated by a trigger unit connected to the protective relay circuits of the power transmission line being served.

In existing fault locators, the recorder is a cathode-ray tube complete with control components, and a photographic camera to take photographs of the pulse characteristic of a faulty line from the CRT screen. Such fault locators display data relative to the position of faults on a line with a considerable delay being required to develop the film.

One object of the present invention is to provide a device for the location of faults in power transmission lines at the instants of occurence thereof, which device displays the results with a minimum of delay.

Another object of the present invention is to provide a device for the location of faults in power transmission lines at the instants of occurence thereof, which device excludes mechanical elements from the recorder.

Still another object of the invention is to provide a device for the location of faults in power transmission lines at the instant of occurrence thereof, which device provides a direct indication of the distance to the fault.

With these and other objects in view, in the fault locator disclosed herein, transmitted and reflected pulses, controlled by a sync-pulse unit, are registered at the instant of a fault in synchronism with calibration markers by a recorder actuated by a trigger unit connected to the protective relay circuits of the line. According to the invention, the recorder comprises a dark-trace tube whose modulator accepts the output of the unit controlling the trace-duration of transmitted and reflected pulses, actuated by the trigger unit and connected to the sync-pulse unit.

Due to this arrangement, a fault locator according to the invention presents the findings with a minimum of delay.

Other objects and advantages of the present invention will be seen from the following description of a preferred embodiment as illustrated in the accompanying drawings wherein.

Figure 1:
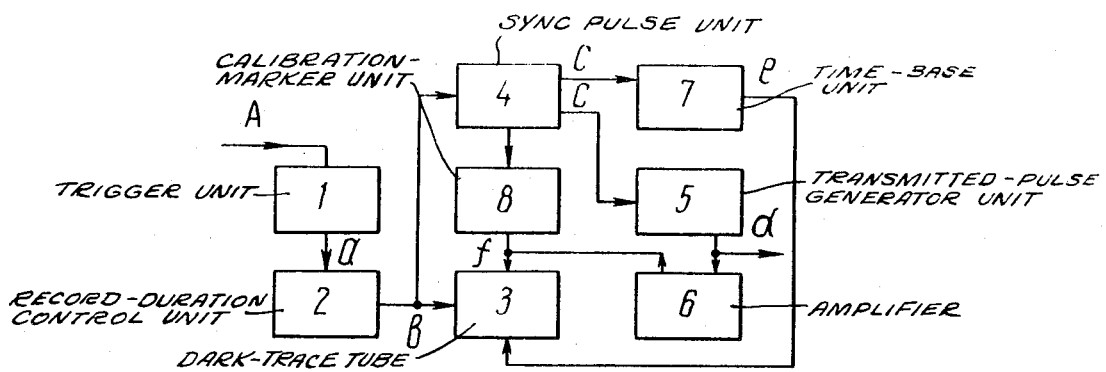
FIG. 1 is a block-diagram of a fault locator according to the invention.

In FIG. I, is a fault locator comprising, according to the invention, a trigger unit 1; a unit 2 to control the trace-duration of transmitted and reflected pulses; a recorder which is a dark-trace tube 3; a sync-pulse unit 4; a transmitted-pulse generator unit 5; an amplifier 6; a time-base unit 7; and a calibration-marker unit 8.

The modulator of the dark-trace tube 3 is connected to the output of the trace-duration control unit 2, the horizontal deflection coil is connected to the time-base unit 7, and the vertical deflection coil is connected to the amplifier 6 and the calibration-marker unit 8.

The pulse from the trace-duration control unit 2 controls the sync-pulse unit 4 which actuates the transmitted-pulse generator unit 5 and the time-base unit 7.

The trigger unit 1, whose input is connected to the protective relay unit of the power transmission line being serviced, forms at its output a short-time voltage pulse the moment the protective relay unit operates.

The unit 2 for control over the record-duration of transmitted and reflected pulses is connected with its input to the output of the trigger unit 1. Generated at the output of the unit 2 with a preset time delay relative to the input pulse is a positive rectangular pulse of certain duration.

The sync-pulse unit 4 is connected to the output of the unit 2. Generated at three outputs of the former unit in the course of duration of the rectangular pulse are a series of short-time sync pulses following each other at uniform intervals.

The input of the transmitted-pulse generator unit 5 is connected to the output of the unit 4, while its output is connected to the power transmission line being serviced. The unit 5 generates, synchronously with each pulse from the sync-pulse unit 4, probing pulses transmitted to the power line.

The amplifier 6, connected with its input to the power transmission line, generates at its output amplified pulses transmitted to the line and reflected from the fault.

The calibration-marker unit 8, connected with its input to the output of the sync-pulse unit 4, generates at its output a set of calibration markers synchronously with each pulse generated by the sync-pulse unit.

The time-base unit 7, connected with its input to the unit 4, generates at its output a saw-tooth wave synchronously with each pulse generated by the sync-pulse unit.

The dark-trace tube 3 with horizontal and vertical deflection coils provides for recording and displaying on the screen as a dark image the transmitted and reflected pulses along with the calibration markers for a subsequent determination of the distance to the fault. Connected to the modulator of the dark-trace tube 3 is the output of the record-duration control unit 2, the vertical deflection coil being connected to the outputs of the amplifier 6 and of the calibration-marker unit 8. The horizontal deflection coil is connected to the output of the time-base unit 7.

Figure 2:
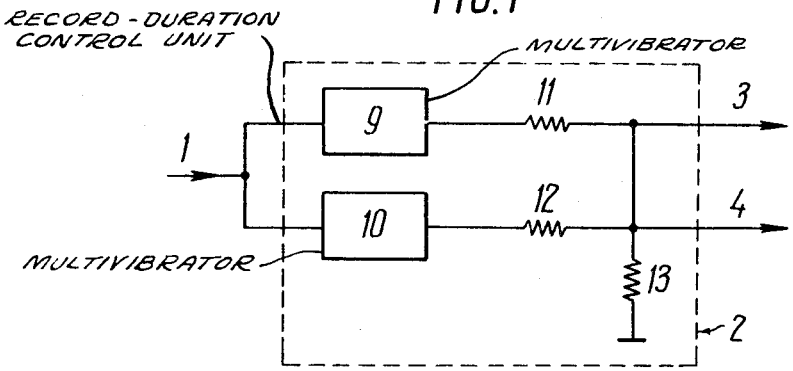
FIG. 2 is a block-diagram of the unit controlling the trace-duration of transmitted and reflected pulses of the fault locator of FIG. 1.

The trace-duration control unit 2 contains multivibrators 9 and 10 (FIG. 2) and resistors 11 through 13 and generates the brightening pulse for the dark-trace tube 3 and gate pulses for the sync-pulse unit 4.

Basically, operation of the fault locator disclosed herein consists of measuring the time interval between the instant of transmission of a pulse into the line being tested and the instant of arrival of a pulse reflected from the fault. This time interval, $\Delta t$, is proportional to the distance, $l$, to the fault:

$$t = 2l/u,$$

so that $$l = (t/2)\, u,$$

where $u$ is the velocity of pulse propagation in overhead power transmission lines.

Figure 3:
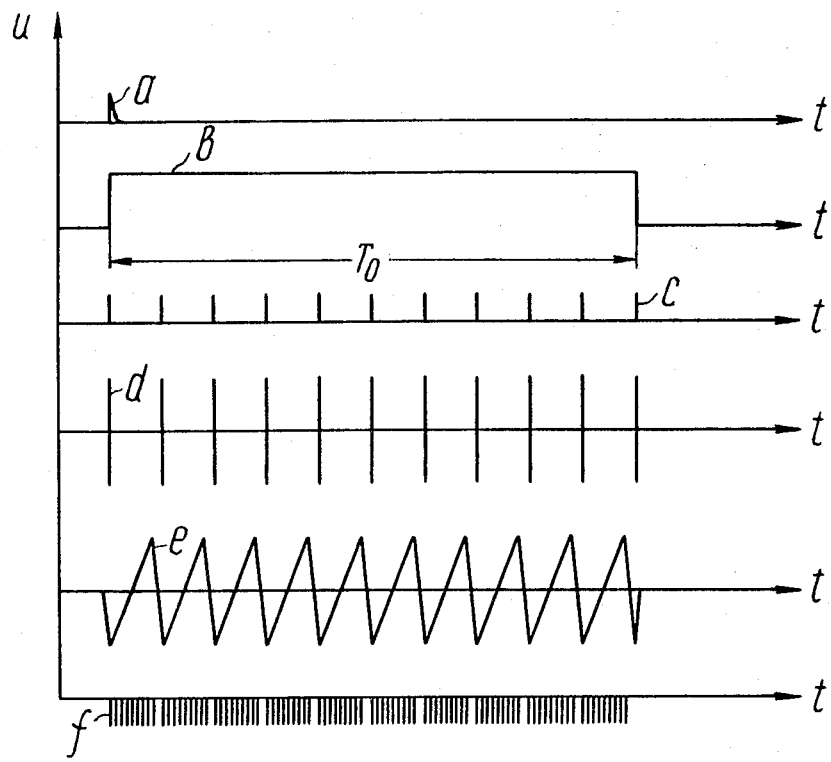
FIG. 3 shows the voltage waveforms obtained by means of the fault locator of the present invention.

For better insight into the operation of the fault locator disclosed herein, reference is next made to the voltage waveforms of FIG. 3, where time $t$ is the scale of the abscissa and the voltage $v$ is the scale of the ordinate. The letters $a$, $b$, $c$, $d$, $e$ and $f$ designate the voltage wave forms corresponding to the points $a, b, c, d, e$ and $f$ in the block-diagram of FIG. 1.

In the case of a fault on the line served by the fault locator, closure of the contacts in protective relays (arrow A in FIG. 1) actuates the trigger circuit 1 (waveform $a$), which triggers the trace-duration control unit 2 generating a positive rectangular pulse of duration $T_0$ (waveform $b$) which goes both to the modulator of the dark-trace tube 3 and to the sync-pulse unit 4.

Figure 4:
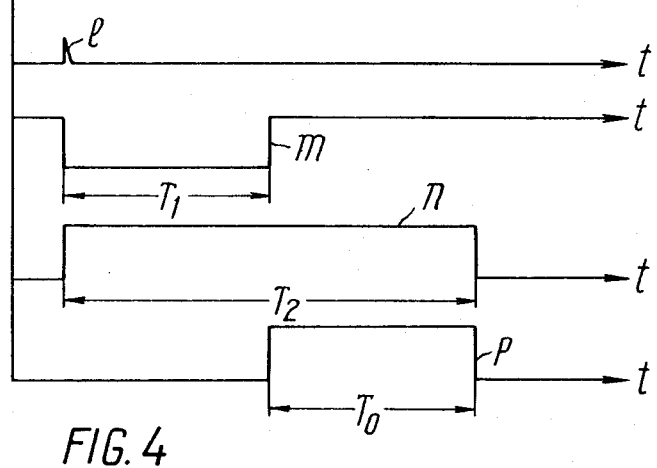
FIG. 4 is a time plot of the pulse waveforms generated by the unit controlling the trace-duration of transmitted and reflected pulses of the fault locator of the present invention.

The output pulse of the trace-duration control unit 2 should be delayed with respect to the instant at which the fault locator is started by a time $T_1$ which is the time required for the transients in the electromagnetic beam deflection system of the dark-trace tube 3 to die down. This pulse appears across the resistor 13 due to the addition of pulses of opposite polarities and of durations $T_1$ and $T_2$, taken from the outputs of the multivibrators 9 and 10, respectively, through the resistors 11 and 12. Referring to the time plot of pulses generated by the trace-duration control unit 2 in FIG. 4 (where the time $t$ is the scale of the abscissa and the voltage $v$ is the scale of the ordinate), at $l$ is the trigger pulse; at $m$ is the pulse generated by the multivibrator 9, of duration $T_1$ equal to the time $T_1$ of the transients in the electromagnetic beam deflection system of the dark-trace tube; at $n$ is the pulse generated by the multivibrator 10, of duration $T_2$; and at $p$ is the brightening pulse for the dark-trace tube 3 and the gate pulse for the sync-pulse unit 4, of duration $T_0 = T_2 - T_1$.

The sync-pulse unit 4 operates for a time $T_0$, as shown in FIG. 3, delivering in the meantime $n$ sync-pulses (the waveform $c$ in FIG. 3) which go to the transmitted-pulse generator unit 5 (waveform $d$), the time-base unit 7 (waveform $e$), and the calibration-marker unit 8 (waveform $f$).

The pulses, both transmitted into the line and reflected from the fault, are fed through the amplifier 6 along with the calibration markers furnished by the unit 8 to the vertical deflection coil of the dark-trace tube 3.

Figure 5:
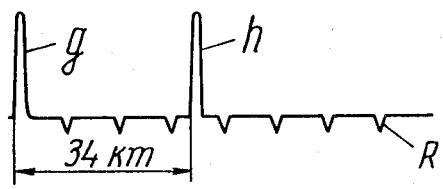
FIG. 5 is an example of the pulse characteristic of a power transmission line, obtained on the screen of the dark-trace tube of the fault locator of the present invention.

The beam writes out the same trace $n$ times, so that the transmitted and reflected pulses are displayed on the screen of the dark-trace tube 3 along with the calibration markers in the form of a dark trace, as shown in FIG. 5, where $g$ is the transmitted pulse, $h$ is the reflected pulse, and R are the calibration markers (spaced 10 km. apart).

The operator can determine the distance to the fault directly from the screen of the dark-trace tube 3 by counting the number of intervals between the calibration markers (both whole ones and the fraction of the last interval) separating the transmitted and the reflected pulses. In the example of FIG. 5, the reflected pulse is located at a distance of 34 km.

The display of the pulses and calibration markers persists for a long time. It can be erased, if necessary, by heating the substrate film coated by scotopic phosphor. This is done by passing a current through the film.

The fault locator disclosed herein is simple and inexpensive to make, convenient to use, displays data with a minimum delay and can be used on all present-day power-transmission lines.

Although the present invention has been disclosed in connection with a preferred embodiment, it is not to be limited to the details shown, as there may be modifications and adaptations without any departure from the idea and scope of the invention, which those skilled in the art will readily comprehend.

Such modifications and adaptations should be considered to be within the range of equivalence of the present invention as set forth in the accompanying claims.

What is claimed is:

1. A device for the location of faults at the instant of occurrence thereof in a power transmission line provided with protective relays, said device comprising: a trigger unit including an input connected to said protective relays, said trigger unit including an output and being adapted to generate at said output, upon operation of said protective relays, a short duration voltage pulse; a record-duration control unit adapted for controlling record duration of probing pulses and pulses reflected from a fault, said further unit including an input connected to the output of said trigger unit and including and being adapted to generate at an output with a preset time delay a positive rectangular pulse of predetermined duration; a sync-pulse unit connected to the output of said record-duration control unit and including and being adapted to generate at a plurality of outputs, during presence at the input thereof of said positive rectangular pulse, a series of short synchronizing pulses following each other at uniform intervals; a transmitted-pulse generator unit including an input connected to one of the outputs of said sync-pulse unit and including an output connected to said power transmission line, said transmitted-pulse generator unit being adapted to generate synchronously with each pulse generated by said sync-pulse unit a probing pulse transmitted to said power transmission line; an amplifier including an input connected to said power transmission line and including and being adapted to generate at an output amplified probing and reflected pulses; a calibration-marker unit including an input connected to one of the outputs of said sync-pulse unit and including and adapted to generate at an output a set of calibration markers synchronously with each pulse generated by said sync-pulse unit; a time-base unit including an input connected to said sync-pulse unit and including and adapted to generate at an output a saw-tooth wave synchronously with each pulse generated by said sync-pulse unit; a dark-trace tube including vertical and horizontal deflection coils and a modulator connected to the output of said record-duration control unit; said vertical deflection coil being connected to the output of said amplifier and to the output of said calibration-marker unit; said horizontal deflection coil being connected to the output of said time-base unit; said dark-trace tube including and being adapted to provide for recording and displaying on a screen, as a dark image, said probing and reflected pulses along with the calibration markers whereby provision is made for a subsequent determination of the distance to the fault in said power transmission line.

* * * * *